US012651155B2

(12) United States Patent
Neumann

(10) Patent No.: US 12,651,155 B2
(45) Date of Patent: Jun. 9, 2026

(54) METHODS AND SYSTEMS FOR SLOT LINKING THROUGH MACHINE LEARNING

(71) Applicant: KPN INNOVATIONS, LLC.,
Lakewood, CO (US)

(72) Inventor: Kenneth Neumann, Lakewood, CO (US)

(73) Assignee: KPN INNOVATIONS, LLC,
Lakewood, CO (US)

( * ) Notice: Subject to any disclaimer, the term of this patent is extended or adjusted under 35 U.S.C. 154(b) by 1041 days.

(21) Appl. No.: 17/062,753

(22) Filed: Oct. 5, 2020

(65) Prior Publication Data

US 2022/0108166 A1 Apr. 7, 2022

(51) Int. Cl.
| | |
|---|---|
| *G06N 3/08* | (2023.01) |
| *G06F 9/445* | (2018.01) |
| *G06F 18/214* | (2023.01) |
| *G06F 18/23* | (2023.01) |

(52) U.S. Cl.
CPC ............. *G06N 3/08* (2013.01); *G06F 9/4451* (2013.01); *G06F 18/214* (2023.01); *G06F 18/23* (2023.01)

(58) Field of Classification Search
CPC ......... G06N 3/08; G06F 18/214; G06F 18/23; G06F 9/4451
See application file for complete search history.

(56) References Cited

U.S. PATENT DOCUMENTS

| | | | |
|---|---|---|---|
| 7,472,097 B1 | 12/2008 | Scarborough et al. | |
| 7,502,748 B1 * | 3/2009 | Baldwin | ................ G06Q 10/06 |
| | | | 705/7.14 |

(Continued)

FOREIGN PATENT DOCUMENTS

| | | | | |
|---|---|---|---|---|
| CN | 109165692 A | * | 1/2019 | ........... G06K 9/6256 |
| CN | 109657542 A | * | 4/2019 | |

OTHER PUBLICATIONS

Wassermann, Benjamin, and Gottfried Zimmermann. "User profile matching: A statistical approach." CENTRIC 2011, The fourth international conference on advances in human-oriented and personalized mechanisms, technologies, and services. (Year: 2011).*

(Continued)

*Primary Examiner* — Shahid K Khan
(74) *Attorney, Agent, or Firm* — Caldwell LLC

(57) ABSTRACT

A system for slot linking through machine learning includes a computing device configured to generate a slot profile by retrieving a plurality of elemental profiles, each elemental profile corresponding to an element of the slot and generating the slot profile as a function of the plurality of elemental profiles, to receive biological extraction data of an entry, to generate an entry tendency profile associated with the entry, wherein generating the tendency profile further includes receiving a plurality of training examples correlating biological extraction data to tendency profiles, training a tendency profile model as a function of the plurality of training examples, and generating the tendency profile as a function of the biological extraction and the tendency profile model, to determine an alignment quantifier as a function of the tendency profile and the slot profile, and link the entry to the slot as a function of the alignment quantifier.

18 Claims, 6 Drawing Sheets

(56) References Cited

U.S. PATENT DOCUMENTS

| | | | |
|---|---|---|---|
| 7,562,059 B2 * | 7/2009 | Scarborough | G06Q 10/10 |
| | | | 705/321 |
| 7,797,302 B2 | 9/2010 | Kenedy et al. | |
| 8,600,100 B2 | 12/2013 | Hill | |
| 9,867,539 B2 | 1/2018 | Heikenfeld et al. | |
| 10,803,421 B1 * | 10/2020 | Garg | G06Q 10/1053 |
| 2007/0059671 A1 * | 3/2007 | Mitchell | G06Q 30/0201 |
| | | | 434/107 |
| 2008/0172415 A1 * | 7/2008 | Fakhari | G06Q 10/10 |
| 2009/0006178 A1 | 1/2009 | Taylor et al. | |
| 2012/0221251 A1 | 8/2012 | Rosenberg et al. | |
| 2012/0284080 A1 * | 11/2012 | De Oliveira | G06Q 30/0201 |
| | | | 705/7.29 |
| 2016/0154569 A1 * | 6/2016 | Rad | G06F 3/0488 |
| | | | 715/739 |
| 2017/0300930 A1 | 10/2017 | Forbes et al. | |
| 2018/0253840 A1 | 9/2018 | Tran et al. | |
| 2019/0102704 A1 * | 4/2019 | Liu | G06N 20/00 |
| 2019/0130361 A1 | 5/2019 | Hazarika et al. | |
| 2020/0023262 A1 * | 1/2020 | Young | G06N 3/044 |
| 2020/0111042 A1 * | 4/2020 | Pham | G06N 20/20 |

OTHER PUBLICATIONS https://www.hirevue.com/products/assessments; Author, Hirevue, Date; Sep. 7, 2020, Title: Combine the Power of Video, Games, and AI for Better Hiring Decisions.

* cited by examiner

Generating a Slot Profile

Receiving a Biological Extraction Relating to an Entry

Determining an Alignment Quantifier

Linking the Entry to the Slot

METHODS AND SYSTEMS FOR SLOT LINKING THROUGH MACHINE LEARNING

FIELD OF THE INVENTION

The present invention generally relates to the field of machine learning. In particular, the present invention is directed to methods and systems for slot linking through machine learning.

BACKGROUND

Prediction of compatibility between complex entities such as persons and/or institutions is frequently frustrated by imperfect information concerning such entities. This is further compounded by an inability of rule-based systems to account for varied affects across populations, and the multiplicity of data that may affect patterns to be detected.

SUMMARY OF THE DISCLOSURE

In an aspect a system for slot linking through machine learning includes a computing device configured to generate a slot profile corresponding to a slot, wherein generating further includes retrieving a plurality of elemental profiles, each elemental profile corresponding to an element of the slot and generating the slot profile as a function of the plurality of elemental profiles, to receive biological extraction data of an entry, to generate an entry tendency profile associated with the entry, wherein generating the tendency profile further includes receiving a plurality of training examples correlating biological extraction data to tendency profiles, training a tendency profile model as a function of the plurality of training examples, and generating the tendency profile as a function of the biological extraction and the tendency profile model, to determine an alignment quantifier as a function of the tendency profile and the slot profile, and link the entry to the slot as a function of the alignment quantifier.

In another aspect a method of slot linking through machine learning includes generating, at a computing device, a slot profile corresponding to a slot, wherein generating further includes retrieving a plurality of elemental profiles, each elemental profile corresponding to an element of the slot and generating the slot profile as a function of the plurality of elemental profiles. The method includes receiving biological extraction data of an entry. The method includes generating an entry tendency profile associated with the entry, wherein generating the tendency profile further include receiving a plurality of training examples correlating biological extraction data to tendency profiles, training a tendency profile model as a function of the plurality of training examples, and generating the tendency profile as a function of the biological extraction and the tendency profile model. The method includes determining an alignment quantifier as a function of the tendency profile and the slot profile. The method includes linking the entry to the slot as a function of the alignment quantifier.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein:

FIG. 1 is a block diagram illustrating an exemplary embodiment of a system for slot linking through machine learning;

Figure 2:
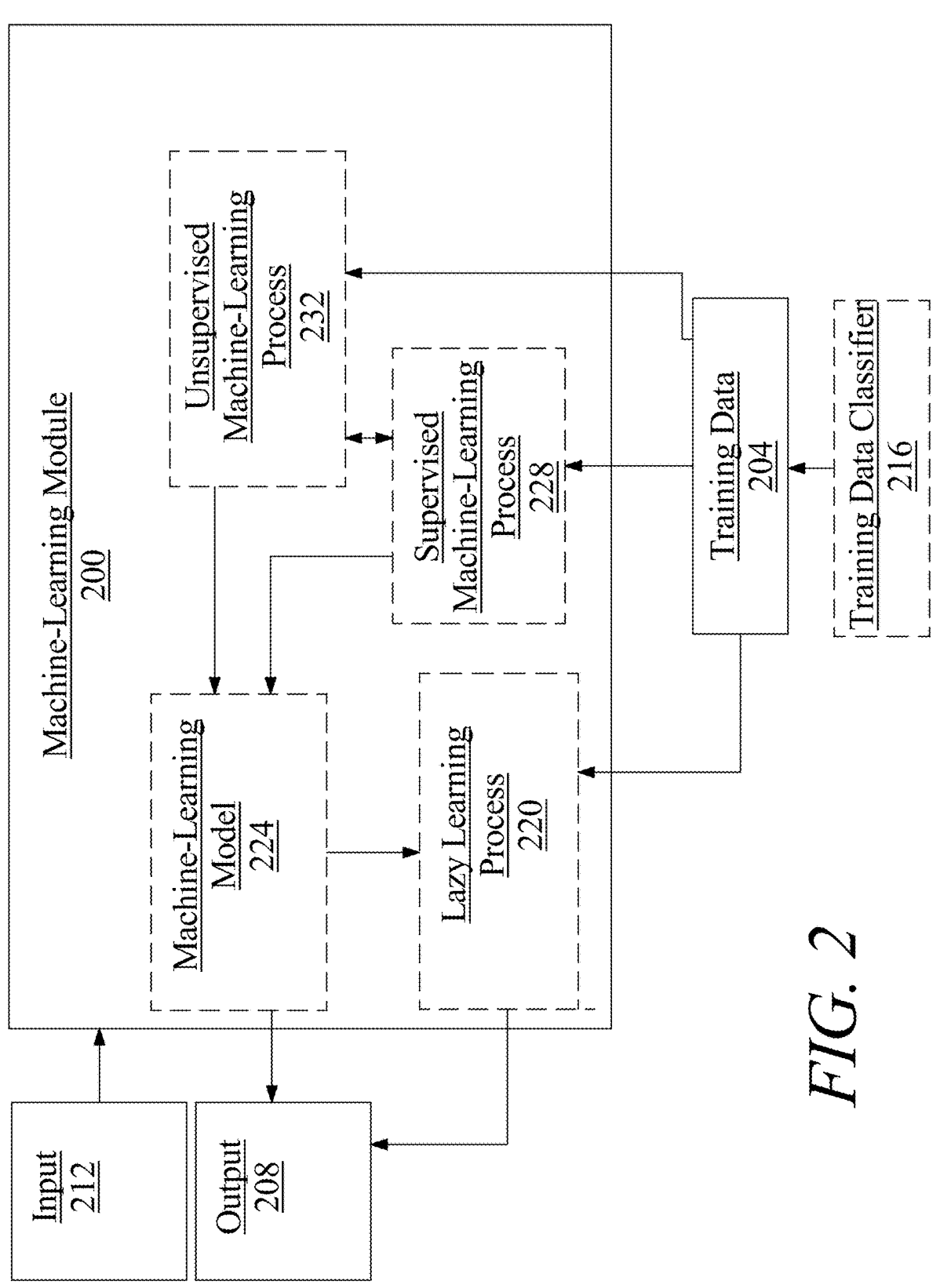
FIG. 2 is a block diagram illustrating an exemplary embodiment of a machine-learning module.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments described herein generate a slot profile relating to a slot to match to an entry, by combining elemental profiles of elements relating to a subject slot. An entry tendency profile is generated and compared to the slot profile, producing a quantifier. Production of the quantifier may be performed using classification algorithms and/or computation of distance metrics.

Figure 1:
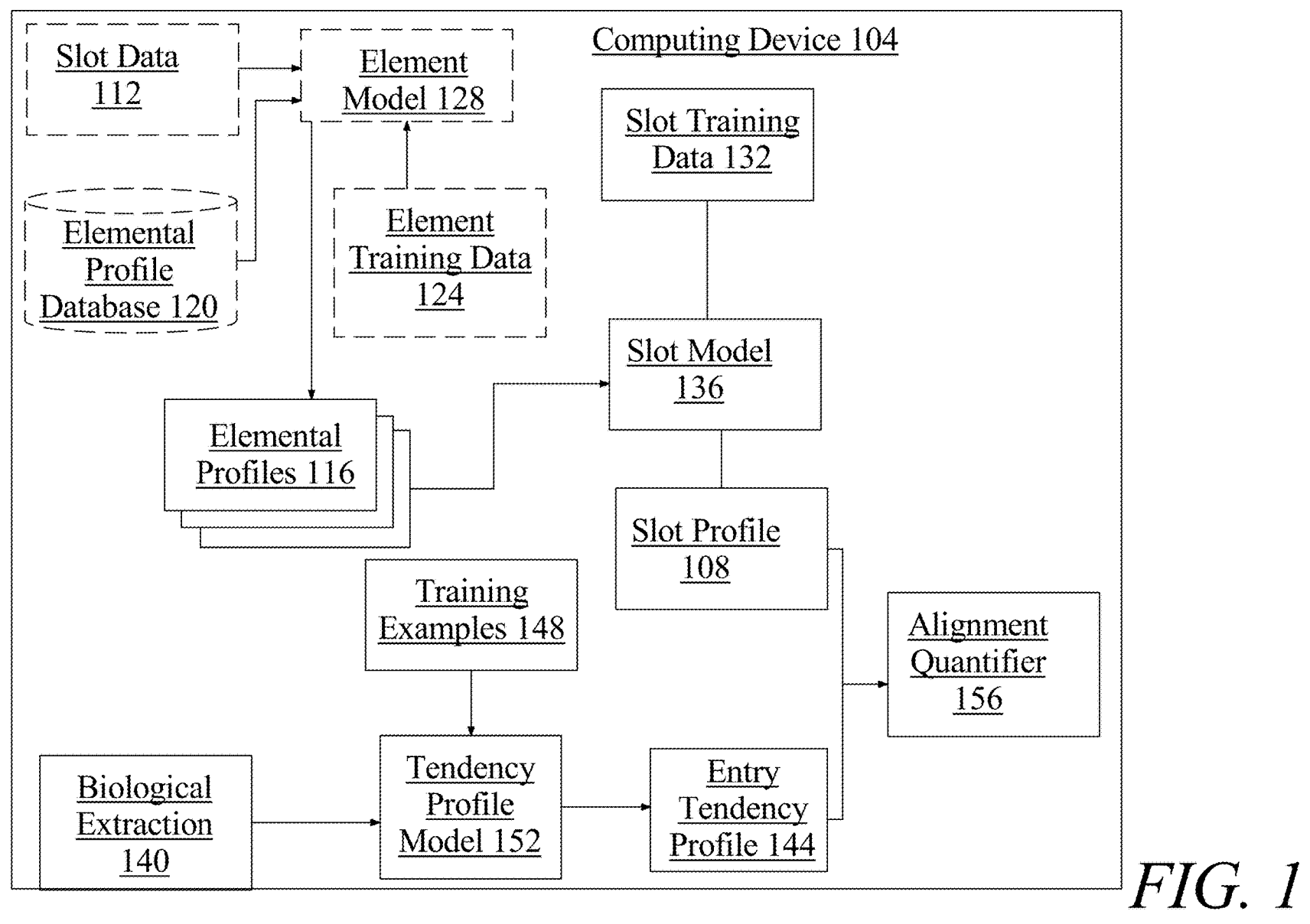

Referring now to FIG. 1, an exemplary embodiment of a system 100 for slot linking through machine learning is illustrated. System includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently, or may include two or more computing device 104 operating in concert, in parallel, sequentially or the like; two or more Computing devices may be included together in a single computing device 104 or in two or more Computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two Computing devices, and any combinations thereof. A network may employ a wired and/or a wireless mode of communication.

In general, any network topology may be used. Information (e.g., data, software etc.) may be communicated to and/or from a computer and/or a computing device 104. Computing device 104 may include but is not limited to, for example, a computing device 104 or cluster of Computing devices in a first location and a second computing device 104 or cluster of Computing devices in a second location. Computing device 104 may include one or more Computing devices dedicated to data storage, security, distribution of traffic for load balancing, and the like. Computing device 104 may distribute one or more computing tasks as described below across a plurality of Computing devices of computing device 104, which may operate in parallel, in series, redundantly, or in any other manner used for distribution of tasks or memory between Computing devices. Computing device 104 may be implemented using a "shared nothing" architecture in which data is cached at the worker, in an embodiment, this may enable scalability of system 100 and/or computing device 104.

Further referring to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to generate a slot profile 108 corresponding to a slot. As used in this disclosure, a "slot" is a position such as an employment position at a firm, company, or the like; slot may include an external or internal hire, a promotion; a gig, a temporary assignment, a contract assignment, or any other new or renewed employment arrangement. In an embodiment, computing device 104 may receive a plurality of slot data 112. Slot data 112 may be received from a device operated by and/or associated with an entity offering and/or having slot; slot data 112 may be retrieved from a database and/or data structure containing data describing such an entity and/or one or more positions thereat. Slot data 112 may include, without limitation, data describing slot, entity, persons working at entity, work environments, job responsibilities of slot and/or related positions, and/or any other information concerning slot and/or circumstances regarding slot.

Further referring to FIG. 1, a "slot profile" as used in this disclosure is a set of quantitative values representing different aspects of slot that represent attributes of slot that may increase and/or decrease affinity of an entry to slot; such attributes may include, without limitation, hours of work required per day, week; or the like, wages and/or salary, degrees to which a person filling; slot must work with others, degrees to which a person filling slot must supervise others, a degree of independence afforded to a person filling slot, a degree of responsibility imposed upon a person filling slot, a degree to which a person filling slot will be required to account for his or her time, an amount of exposure to different stimuli and/or hazards attendant to slot, a degree of physical exertion associated with slot, a degree of skill required in one or more areas and/or disciplines, or the like. Slot profile 108 values may correspond to tendency profile values as described in further detail below. Slot profile 108 may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm:

$$l = \sqrt{\sum_{i=0}^{n} a_i^2},$$

where $\alpha_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Continuing to refer to FIG. 1, generating slot profile 108 includes retrieving a plurality of elemental profiles 116, each elemental profile corresponding to an element of the slot. As used in this disclosure, an "element" is an employee or other person, work environment, type of work, and/or other aspect of a slot. As used in this disclosure, an "elemental profile" is a set of quantitative values, corresponding to fields suitable for use in and/or comparison to a slot profile 108; comparison may include comparison using vector geometry, distance metrics, or other alignment quantifier computations as described below. Plurality of elemental profiles 116 may include at least one tendency profile. As used in this disclosure, a "tendency profile" is an elemental profile of a person, such as a current employee, supervisor or other participant in a workplace and/or a prospective employee such as an entry as defined in further detail below, A tendency profile may include one or more quantitative attributes corresponding to attributes of a slot profile, such as attributes measuring affinity to different quantities of hours worked in a day, week or the like, an attribute measuring a degree of importance of magnitude of wages and/or salary, a quantity representing a degree of affinity or distaste for collaborative work, work in close proximity, meetings, work in teams, and/or solitary work, a quantity representing a degree of affinity or distaste for supervision of other persons and/or their work, a quantity representing a degree of affinity or distaste for working independently, a quantity representing a degree of affinity or distaste for responsibility, a quantity representing a degree of affinity or distaste for accounting for time, a quantity representing a degree of affinity or distaste for exposure to different stimuli and/or hazards, a quantity representing a degree of affinity or distaste for physical exertion, a quantity representing a degree of affinity or distaste for skill development and/or use, or the like. Plurality of elemental profiles 116 may include at least one location profile. As used in this disclosure, a "location profile" is an elemental profile of a workplace, such as an office, warehouse, factory floor, category of outdoor or indoor work site such as power lines for linemen, landscaping sites for landscapers, construction sites for construction workers, rooms and/or dwellings to be cleaned and/or repaired by housecleaners, repair personnel, plumbers, electricians or the like, or any other location where a person performing job functions according to slot would be working. Plurality of elemental profiles 116 may include at least a position profile. As used in this disclosure, a "position profile" is an elemental profile corresponding to a job description and/or role of a person who will be filling a slot, including a profile relating to job requirements, responsibilities, expected background and/or or the like.

Still referring to FIG. 1, retrieval of elemental profiles 116 may include retrieval thereof from an elemental profile database 120. Elemental profile database 120 may be implemented, without limitation, as a relational database, a key-value retrieval database such as a NOSQL database, or any other format or structure for use as a database that a person skilled in the art would recognize as suitable upon review of the entirety of this disclosure. Elemental profile database 120 may alternatively or additionally be implemented using a distributed data storage protocol and/or data structure, such as a distributed hash table or the like. Elemental profile database 120 may include a plurality of data entries and/or records as described above. Data entries in elemental profile database 120 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in elemental profile database 120 may store, retrieve, organize, and/or reflect data and/or records as used herein, as well as categories and/or populations of data consistently with this disclosure.

With continued reference to FIG. 1, computing device 104 may be configured to generate an elemental profile of the plurality of elemental profiles 116. In an embodiment, generation of an elemental profile may be accomplished using a machine-learning process. Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device 104/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device 104 and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Referring again to FIG. 1, and as a non-limiting example, generation of an elemental profile may include receiving elemental training data 124 correlating element data, defined for the purposes of this closure as data describing an element, to elemental profiles 116. Generation of an elemental profile may further include training an elemental model as a function of the elemental training data 124; this may be accomplished without limitation; using any machine-learning process and/or algorithm described in this disclosure. Computing device 104 may use element model 128 to generate elemental profile; for instance, computing device 104 may receive element data, input the element data to the element model 128, and generate the element profile as a function of the element model 128, for instance by outputting the elemental profile from the element model 128. Element data may be received, without limitation, from an employee, supervisor, or other person associated with an entity proffering slot, and/or from or by way of a recruiter working to fill slot. Data used to generate tendency profiles, for instance, may be collected from person to whom resulting tendency profiles correspond; such data may include, without limitation, any biological extraction data as described in further detail below, as well as, without limitation, questions pertaining to and/or measuring degrees of affinity and/or dislike as measured in relation to tendency profiles. Elemental profiles 116 may include tendency profiles of one or more persons in the workplace associated with the slot, with a workplace environment such as an office, floor, building, warehouse, factory floor, outdoor environment, or the like, with a kind of work, such as without limitation, physical attributes of the kind of work, types of tasks required for completion, multitasking required, degree of communication with other clients and/or employees, or the like. Data describing slot, as entered for instance by a user at a firm associated with the slot and/or a recruiter or the like, may be used to select particular categories of elemental profile to include in and/or combine to form slot profile 108.

With continued reference to FIG. 1, computing device 104 may generate one or more elemental profiles 116 using machine-learning processes; machine-learning processes may include any machine-learning process as described in this disclosure. For instance, and without limitation, generating elemental profiles 116 may include receiving a plurality of training examples 148 and/or training data correlating data describing a corresponding element to elemental profile elements. For instance, where an elemental profile is a tendency profile as described above, a training example may include data provided by a person such as biological transaction data as described in further detail below, questionnaire data, or the like, correlated with one or more metrics measuring work performance, happiness, length of tenure in a position, hours worked per week, or the like. As a further example, a training example for a "location profile" may correlate one or more data describing a location to tendency profiles of persons working in that location and metrics measuring work performance, happiness, length of tenure, and the like as described above; this may correlate attributes of a location to its likely effect on persons as measured according to their tendency profiles. As another example, a training example for a position profile may correlate one or more data profile corresponding to a job description and/or role of a person fill a slot to tendency profiles of persons working in that slot and metrics measuring work performance, happiness, length of tenure, and the like as described above: this may correlate attributes of a slot to its likely effect on persons as measured according to their tendency profiles. Persons skilled in the art, upon reviewing the entirety of this disclosure, upon reviewing the entirety of this disclosure, will be aware of various training examples 148 that may be used for generation of elemental profiles 116. Computing device 104 may be further configured to generate an elemental profile by training an elemental profile model as a function of the plurality of training examples 148; this may be accomplished, without limitation, using any machine-learning process as described above. Computing device 104 is configured to generate an elemental profile as a function of the data describing the element, such as biological extraction 140 data of one or more persons, data describing a location, data describing a position, or the like and the elemental profile model; for instance and without limitation, computing device 104 may input one or more elements of data describing elements to the elemental profile model and output elemental profile scores.

Further referring to FIG. 1, a selection of categories may be used to select models to be used in generating elemental profiles 116. For instance, a model used to generate an environmental profile or other profile associated with a workplace may be selected based on a category of such workplace, a particular industry, or the like; as a non-limiting example, a different model may be used to generate profiles of work environments, types of tasks, or the like associated with an ironworks than a model for generating such profiles associated with an actuarial firm. Tendency profiles may similarly be generated using different models for different kinds of work roles and/or environments, for instance to reflect differing pertinence of particular tendencies to particular roles and/or environments; for instance, jobs requiring intense physical activities may cause to be relevant the ways in which persons or teams engaging in such activities manage exertion, rest, nutrition, or the like, while such tendencies may have far less importance for jobs in which physical aspects of work are confined to typing. Similarly, some tendencies may be far more crucial where a group of people work in a closely coordinated fashion, such as on an assembly line, in a kitchen or as a work crew in construction or the like, while being of far less consequence in jobs requiring largely solitary effort.

Still referring to FIG. 1, computing device 104 is configured to generate slot profile 108 as a function of the plurality of elemental profiles 116. In an embodiment, computing device 104 may, for instance, where slot profile 108 and elemental profiles 116 are represented as collections and/or n-tuples of quantitative values, slot profile 108 may be generated by component-wise addition of n-tuple elements and/or normalization of resulting sums; addition may including averaging, making weighted sums, or the like. Alternatively or additionally, slot profile 108 may be generated by concatenating and/or combining individual elemental profiles 116 in a data structure in which each such profile may be examined individually.

Continuing to refer to FIG. 1, slot profile 108 may be generated from one or more elemental profiles 116 using a machine-learning process and/or model that inputs elemental profiles 116 and outputs a slot profile 108. In an embodiment, use of a machine-learning process and/or model may enable use of more complex and/or less obvious interdependencies between elemental profile elements and slot profile 108 elements to be created; for instance, if a body of employees tends to have similar tendency profiles between such employees, slot profile 108 may reflect a complementary set of tendencies that differ from those of the employees, such that a person having a tendency profile differing in one or more significant aspects from those of the existing employees may be preferred according to a quantifier as described below. Generating slot profile 108 may include receiving slot training data 132 that correlates elemental profile components with slot profile 108 elements, training a slot profile machine-learning model 136 as a function of the slot training data 132, and generating the slot profile 108 as a function of the slot profile machine-learning model 136 and the plurality of element profiles. Slot training data 132 may be received and/or produced by collecting employee reviews and/or feedback regarding one or more slots, as well as collecting one or more metrics measuring work performance, happiness, length of tenure in a position, hours worked per week, or the like, which computing device 104 may correlate to element profiles collected and/or generated regarding a slot. In this way, slot profile 108 elements may be related to elemental profiles 116 in training data, and used to train a slot-profile machine-learning model, which may include any machine-learning model as described above, and which may be trained according to any machine-learning process described above.

Figure 3:
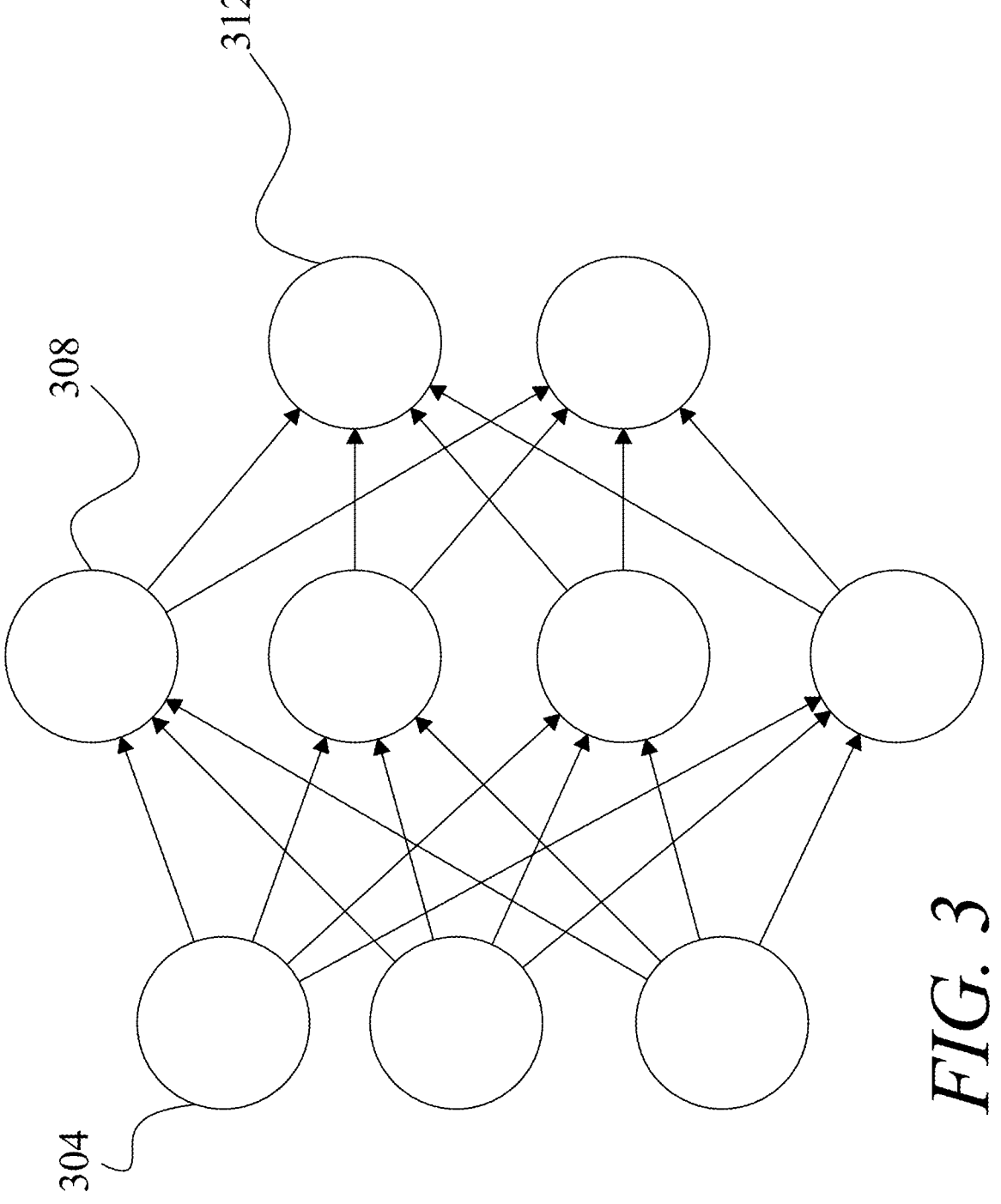
FIG. 3 is a block diagram illustrating an exemplary embodiment of a neural network.

Still referring to FIG. 1, slot profile machine-learning model 136 may include a neural network. Referring now to FIG. 3, an exemplary embodiment of a neural network is illustrated. A "neural network," also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Figure 4:
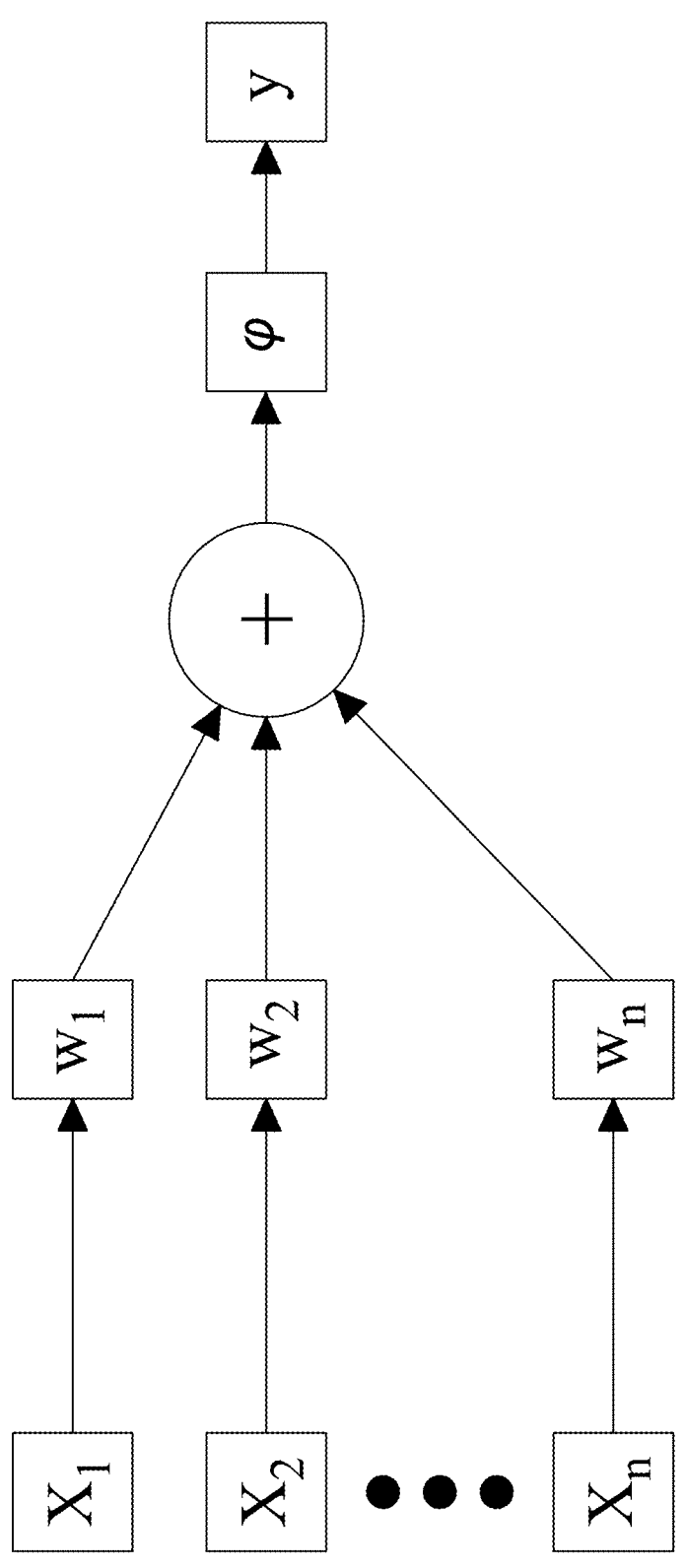
FIG. 4 is a block diagram illustrating an exemplary embodiment of a node in a neural network.

Referring now to FIG. 4, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 4, a neural network may receive elemental profile inputs and output elements of a slot profile 108 according to weights $w_i$ that are derived using machine-learning processes as described above.

Further referring to FIG. 1, computing device 104 is configured to receive biological extraction 140 data of an entry. An "entry," as used in this disclosure, is a person seeking to fill a slot, for instance and without limitation by being hired to till the slot; an entry may include, without limitation, a prospective employee, contractor, or the like. Biological extraction 140 data may alternatively or additionally include any data used as a biological extraction 140 as described in U.S. Nonprovisional application Ser. No. 16/502,835, filed on Jul. 3, 2019, and entitled "METHODS AND SYSTEMS FOR ACHIEVING VIBRANT CONSTITUTION BASED ON USER INPUTS," the entirety of which is incorporated herein by reference. In an embodiment, biological extraction 140 may include a questionnaire. For instance, and without limitation, biological extraction 140 may include psychological data. Psychological data may include any data generated using psychological, neuropsychological, and/or cognitive evaluations, as well as diagnostic screening tests, personality tests, personal compatibility tests, or the like; such data may include, without limitation, numerical score data entered by an evaluating professional and/or by a subject performing a self-test such as a computerized questionnaire. Psychological data may include textual, video, or image data describing testing, analysis, and/or conclusions entered by a medical professional such as without limitation a psychologist, psychiatrist, psychotherapist, social worker, a medical doctor, or the like. Psychological data may include data gathered from user interactions with persons, documents, and/or Computing devices 104; for instance, user patterns of purchases, including electronic purchases, communication such as via chat-rooms or the like, any textual, image, video, and/or data produced by the subject, any textual image, video and/or other data depicting and/or describing the subject, or the like. Any psychological data and/or data used to generate psychological data may be analyzed using machine-learning and/or language processing module as described in this disclosure. As a non-limiting example, biological extraction 140 108 may include a psychological profile; the psychological profile may be obtained utilizing a questionnaire performed by the user. Biological extraction 140 may include one or more user-entered descriptions of a person's physiological state. One or more user-entered descriptions may include, without limitation, user descriptions of symptoms, which may include without limitation current or past physical, psychological, perceptual, and/or neurological symptoms, user descriptions of current or past physical, emotional, and/or psychological problems and/or concerns, user descriptions of past or current treatments, including therapies, nutritional regimens, exercise regimens, pharmaceuticals or the like, or any other user-entered data that a user may provide to a medical professional when seeking treatment and/or evaluation, and/or in response to medical intake papers, questionnaires, questions from medical professionals, or the like.

Still referring to FIG. 1, computing device 104 is configured to generate an entry tendency profile 144 associated with the entry. Entry tendency profile 144 may include, without limitation, any tendency profile as described above. Generating tendency profile includes receiving a plurality of training examples 148 correlating; biological extraction 140 data to tendency profiles; this training data may be collected as described above for tendency profiles that make up elemental profiles 116. Computing device 104 is further configured to generate tendency profile by training a tendency profile model 152 as a function of the plurality of training examples 148; this may be accomplished, without limitation, using any machine-learning process as described above. Computing device 104 is configured to generate the entry tendency profile 144 as a function of the biological extraction 140 and the tendency profile model 152; for instance and without limitation, computing device 104 may input one or more elements of biological extraction 140 data to the tendency profile model 152 and output tendency profile scores.

With continued reference to FIG. 1, computing device 104 is configured to determine an alignment quantifier 156 as a function of entry tendency profile 144 and slot profile 108. An "alignment quantifier," as used in this disclosure, is a quantitative value that represents a degree to which a tendency profile matches a slot profile 108; alignment quantifier 156 may indicate a greater degree of matching and/or affinity where alignment quantifier 156 is smaller in some embodiments, while in others a greater degree of affinity is indicated for a larger alignment quantifier 156. For instance, and without limitation, alignment quantifier 156 may be determined using a proximity function which generates a distance metric between, for instance, vector representations or other geometric representations of slot profiles 108 and tendency profiles. Distance metric may include any distance metric usable between vectors as described above and/or in a classification process. For instance, a classifier may be configured to output at least a datum that labels or otherwise identifies a set of data that are clustered together, found to be close under a distance metric as described below, or the like. Computing device 104 and/or another device may generate a classifier using a classification algorithm, defined as a process whereby a computing device 104 derives a classifier from training data, for instance as described above. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A) \div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like.

Still referring to FIG. 1, determination of alignment quantifier 156 may include determination of an alignment quantifier 156 for each pairing of entry tendency profile 144 with each of a plurality of elementary profiles making up slot profile 108, where slot profile 108 is represented as a plurality of related elementary profiles as described above; such individual quantifiers may then be aggregated, for instance by addition, averaging, or the like, to form an overall alignment quantifier 156. Alternatively, where slot profile 108 is a data structure, such as without limitation a vector or other enumeration, having elements corresponding to elements of tendency profile, any of the above-described methods for generating alignment quantifier 156 may be performed with tendency profile and slot profile 108.

In an embodiment, and continuing to refer to FIG. 1, alignment quantifier 156 may be further determined as a function of entry background information. "Entry background information," as used in this disclosure, is information describing qualifications, experience, education, or other job-relevant data concerning an entry. An entry may be prompted to enter entry background data using one or more web forms, drop-down selections, or the like; alternatively or additionally, entry may enter, transmit to computing device 104, or otherwise provide one or more documents such as a resume, curriculum vitae, links to social media sites, or the like. Any or all such entries may be analyzed using a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may compare extracted words to categories of physiological data recorded at diagnostic engine, one or more prognostic labels recorded at diagnostic engine, and/or one or more categories of prognostic labels recorded at diagnostic engine; such data for comparison may be entered on diagnostic engine as described above using expert data inputs or the like. In an embodiment, one or more categories may be enumerated, to find total count of mentions in such documents. Alternatively or additionally, language processing module may operate to produce a language processing model. Language processing model may include a program automatically generated by computing device 104 and/or language processing module to produce associations between one or more words extracted from at least a document and detect associations, including without limitation mathematical associations, between such words, and/or associations of extracted words with categories of physiological data, relationships of such categories to prognostic labels, and/or categories of prognostic labels. Associations between language elements, where language elements include for purposes herein extracted words, categories of physiological data, relationships of such categories to prognostic labels, and/or categories of prognostic labels may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device 104, or the like.

Further referring to FIG. 1, language processing module and/or diagnostic engine may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word category of physiological data, a given relationship of such categories to prognostic labels, and/or a given category of prognostic labels. There may be a finite number of category of physiological data, a given relationship of such categories to prognostic labels, and/or a given category of prognostic labels to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category of physiological data, a given relationship of such categories to prognostic labels, and/or a given category of prognostic labels. In an embodiment, diagnostic engine may perform this analysis using a selected set of significant documents, such as documents identified by one or more experts as representing good science, good clinical analysis, or the like; experts may identify or enter such documents via graphical user interface, or may communicate identities of significant documents according to any other suitable method of electronic communication, or by providing such identity to other persons who may enter such identifications into diagnostic engine. Documents may be entered into a computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Further referring to FIG. 1, one or more requirements may be combined with slot profile 108, while one or more elements of entry background information may be combined with tendency profile, to permit them to be a part of alignment quantifier 156 calculation. Alternatively or additionally alignment quantifier 156 may be weighted according to one or more background entries, where missing an element required or requested by a user and/or entity proffering slot may cause alignment quantifier 156 to indicate entry is less desirable, for instance, or a particularly advantageous but not strictly required element of background such as a particular kind of job experience or academic degree may cause alignment quantifier 156 to indicate entry is more desirable.

Still referring to FIG. 1, computing device 104 is configured to link entry to slot as a function of the alignment quantifier 156. Linking entry to slot may including generating a datum indicating that entry should be employed at slot; in other words, linking may indicate recommendation that entry should be employed at a position represented by slot. In an embodiment, computing device 104 may select one entry out of a plurality of entries. For instance, and without limitation, a plurality of entries may be ranked according to associated alignment quantifiers 156; computing device 104 may select a highest ranking entry, present a ranked list of entries to a user who selects an entry to link from the list, or the like.

With continued reference to FIG. 1, linking may include filtering a plurality of entries by comparing associated entry backgrounds to one or more requirements, such as requirements that may be input by user at a firm associated with the slot and/or a recruiter or the like; user may specify hard requirements for elements of background that are absolutely required, and computing device 104 may eliminate entries lacking such elements. User may specify that some requirements are soft requirements, which may be used as part of quantifier calculation as above and/or as one or more weights as described above. Computing device 104 may provide, without limitation, graphical user interface entries permitting user to enter and/or select hard requirements and/or soft requirements, which computing device 104 may process as described above.

Still referring to FIG. 1, computing device 104 may transmit a selection to a client device, for instance by display a selected entry and/or ranked list to a user at a firm associated with the slot and/or a recruiter or the like, and may receive selection and/or rejection from the user; In latter, case, computing device 104 may remove entry from list and/or selection, and may recommend a next-highest ranking entry, rerun the above steps with regard to remaining entries, or the like.

Figure 5:
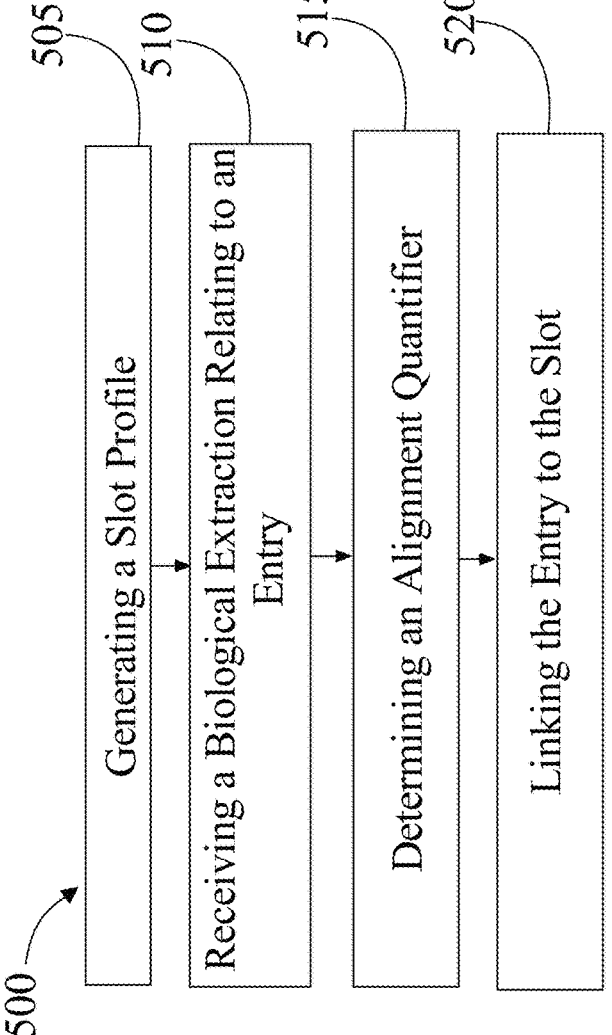
FIG. 5 is a flow diagram illustrating an exemplary embodiment of a method of slot linking through machine learning.

Referring now to FIG. 5, an exemplary embodiment of a method 500 of slot linking through machine learning is illustrated. At step 505, a computing device 104 generating a slot profile 108 corresponding to a slot; this may be implemented, without limitation, as described above in reference to FIGS. 1-4. Generating includes retrieving a plurality of elemental profiles 116, each elemental profile corresponding to an element of the slot; for instance and without limitation, plurality of elemental profiles 116 may include at least one tendency profile, at least one location profile, at least a position profile, or the like. Computing device 104 may generate an elemental profile of the plurality of elemental profiles 116, for instance as described above in reference to FIGS. 1-4. Computing device 104 generates slot profile 108 as a function of the plurality of elemental profiles 116. For instance, and without limitation, computing device 104 may generate the slot profile 108 by receiving slot training data 132 that correlates elemental profile components with slot profile 108 elements, training a slot profile machine-learning model 136 as a function of the slot training data 132, and generating the slot profile 108 as a function of the slot profile machine-learning model 136 and the plurality of element profiles. Slot profile machine-learning model 136 may include a neural network.

At step 510, and still referring to FIG. 5, computing device 104 receives biological extraction 140 data of an entry; this may be implemented, without limitation, as described above in reference to FIGS. 1-4. For instance, and without limitation, biological extraction 140 may include a questionnaire entry.

At step 515, and with continued reference to FIG. 5, computing device 104 generates an entry tendency profile 144 associated with the entry; this may be implemented, without limitation, as described above in reference to FIGS. 1-4. Generating tendency profile includes receiving a plurality of training examples 148 correlating biological extraction 140 data to tendency profiles, training a tendency profile model 152 as a function of the plurality of training examples 148, and generating the tendency profile as a function of the biological extraction 140 and the tendency profile model 152.

At step 520, and still referring to FIG. 5, computing device 104 determines an alignment quantifier 156 as a function of the tendency profile and the slot profile 108; this may be implemented, without limitation, as described above in reference to FIGS. 1-4. Alignment quantifier 156 may be determined using a proximity function. Alignment quantifier 156 may be further determined as a function of entry background information.

At step 525, and further referring to FIG. 5, computing device 104 links entry to slot as a function of the alignment quantifier 156; this may be implemented, without limitation, as described above in reference to FIGS. 1-4.

It is to be noted that any one or more of the aspects and embodiments described herein may be conveniently implemented using one or more machines (e.g., one or more Computing devices that are utilized as a user computing device 104 for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device 104) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device 104) and any related information (e.g., data structures and data) that causes the machine to perform any one of the methodologies and/or embodiments described herein.

Examples of a computing device 104 include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device 104 may include and/or be included in a kiosk.

Figure 6:
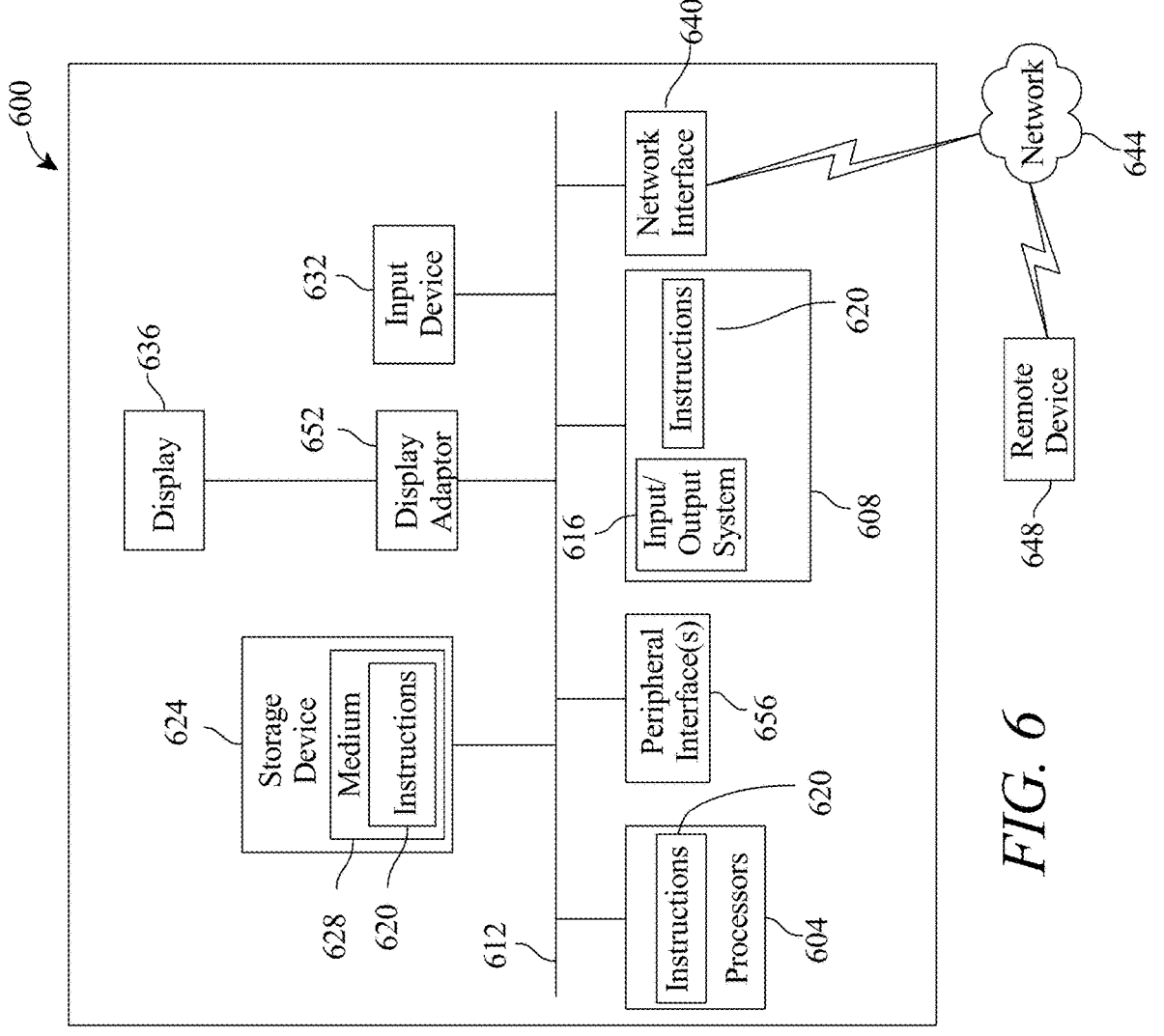
FIG. 6 is a block diagram of a computing system that can be used to implement any one or more of the methodologies disclosed herein and any one or more portions thereof.

FIG. 6 shows a diagrammatic representation of one embodiment of a computing device 104 in the exemplary form of a computer system 600 within which a set of instructions for causing a control system to perform any one or more of the aspects and/or methodologies of the present disclosure may be executed. It is also contemplated that multiple Computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two Computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for slot linking through machine learning, the system comprising a computing device, the computing device configured to:

generate a slot profile corresponding to a slot, wherein generating the slot profile further comprises:

retrieving a plurality of elemental profiles, each elemental profile corresponding to an element of the slot; and generating the slot profile as a function of the plurality of elemental profiles, wherein each of the plurality of elemental profiles comprises a set of quantitative values represented as an n-tuple in a multidimensional vector space, and wherein generating the slot profile comprises concatenating the plurality of elemental profiles into a data structure configured for vector comparison and normalization, wherein each of the plurality of elemental profiles is examined individually;

receive a biological extraction of an entry, wherein the biological extraction comprises physiological and psychological data obtained using a computerized questionnaire and stored in machine-readable memory;

generate an entry tendency profile associated with the entry, wherein generating the entry tendency profile further comprises:

receiving a plurality of training examples correlating biological extraction data to tendency profiles, wherein the biological extraction data comprises physiological data;

training a tendency profile model as a function of the plurality of training examples; and generating the entry tendency profile as a function of the biological extraction and the tendency profile model;

determine an alignment quantifier as a function of the tendency profile and the slot profile, wherein determining the alignment quantifier comprises computing a proximity function between the normalized vector of the entry tendency profile and the slot profile, the proximity function comprising at least one distance metric selected from cosine similarity and Euclidean distance, and wherein the alignment quantifier comprises a quantitative value representing a degree of compatibility; and link the entry to the slot as a function of the alignment quantifier, wherein linking the entry to the slot further comprises filtering a plurality of entries by comparing associated entry backgrounds to one or more requirements, wherein each requirement of the one or more requirements is assigned a requirement status, and wherein linking the entry to the slot further comprises automatically ranking a plurality of entries as a function of respective alignment quantifiers and filtering the plurality of entries by comparing entry background information to predefined slot requirements, each requirement being assigned a requirement status stored in memory.

2. The system of claim 1, wherein the elemental profiles include at least one tendency profile.

3. The system of claim 1, wherein the elemental profiles include at least one location profile.

4. The system of claim 1, wherein the elemental profiles include at least a position profile.

5. The system of claim 1, wherein the computing device is further configured to generate an elemental profile of the plurality of elemental profiles.

6. The system of claim 1, wherein generating the slot profile further comprises:

receiving slot profile training data that correlates elemental profile components with slot profile elements;

training a slot profile machine-learning model as a function of the slot profile training data; and generating the slot profile as a function of the slot profile machine-learning model and the plurality of element profiles.

7. The system of claim 6, wherein the slot profile machine-learning model further comprises a neural network.

8. The system of claim 1, wherein the alignment quantifier is determined using a proximity function.

9. The system of claim 1, wherein the alignment quantifier is further determined as a function of entry background information.

10. A method of slot linking through machine learning, the method comprising:

generating, at a computing device, a slot profile corresponding to a slot, wherein generating the slot profile further comprises:

retrieving a plurality of elemental profiles, each elemental profile corresponding to an element of the slot; and generating the slot profile as a function of the plurality of elemental profiles, wherein each of the plurality of elemental profiles comprises a set of quantitative values represented as an n-tuple in a multidimensional vector space, and wherein generating the slot profile comprises concatenating the plurality of elemental profiles into a data structure configured for vector comparison and normalization, wherein each of the plurality of elemental profiles is examined individually;

receiving, by the computing device, a biological extraction of an entry, wherein the biological extraction comprises physiological and psychological data obtained using a computerized questionnaire and stored in machine-readable memory;

generating, by the computing device, an entry tendency profile associated with the entry, wherein generating the entry tendency profile further comprises:

receiving a plurality of training examples correlating biological extraction data to tendency profiles, wherein the biological extraction data comprises physiological data;

training a tendency profile model as a function of the plurality of training examples; and generating the entry tendency profile as a function of the biological extraction and the tendency profile model;

determining, by the computing device, an alignment quantifier as a function of the tendency profile and the slot profile, wherein determining the alignment quantifier comprises computing a proximity function between the normalized vector of the entry tendency profile and the slot profile, the proximity function comprising at least one distance metric selected from cosine similarity and Euclidean distance, and wherein the alignment quantifier comprises a quantitative value representing a degree of compatibility; and linking, by the computing device, the entry to the slot as a function of the alignment quantifier, wherein linking the entry to the slot further comprises filtering a plurality of entries by comparing associated entry backgrounds to one or more requirements, wherein each requirement of the one or more requirements is assigned a requirement status, and wherein linking the entry to the slot further comprises automatically ranking a plurality of entries as a function of respective alignment quantifiers and filtering the plurality of entries by comparing entry background information to predefined slot requirements, each requirement being assigned a requirement status stored in memory.

11. The method of claim 10, wherein the elemental profiles include at least one tendency profile.

12. The method of claim 10, wherein the elemental profiles include at least one location profile.

13. The method of claim 10, wherein the elemental profiles include at least a position profile.

14. The method of claim 10 further comprising generating an elemental profile of the plurality of elemental profiles.

15. The method of claim 10, wherein generating the slot profile further comprises:

receiving slot profile training data that correlates elemental profile components with slot profile elements;

training a slot profile machine-learning model as a function of the slot profile training data; and generating the slot profile as a function of the slot profile machine-learning model and the plurality of element profiles.

16. The method of claim 15, wherein the slot profile machine-learning model further comprises a neural network.

17. The method of claim 10, wherein the alignment quantifier is determined using a proximity function.

18. The method of claim 10, wherein the alignment quantifier is further determined as a function of entry background information.

* * * * *